United States Patent [19]

Matui et al.

[11] Patent Number: 4,743,664

[45] Date of Patent: May 10, 1988

[54] PROCESS FOR PRODUCING α,β-UNSATURATED CARBOXYLIC ACID POLYMER

[76] Inventors: Tadashi Matui; Hidetaka Tobita, both of Wakayama, Japan

[21] Appl. No.: 932,316

[22] Filed: Nov. 19, 1986

[30] Foreign Application Priority Data

Nov. 21, 1985 [JP] Japan .................. 60-262252

[51] Int. Cl.[4] .............. C08F 4/08; C08F 20/06
[52] U.S. Cl. ........................ 526/64; 526/88;
526/234; 526/240; 526/286; 526/287;
526/292.95; 526/307.6; 526/318.42; 526/318.2;
526/318.5; 526/917; 252/175
[58] Field of Search ............ 526/64, 88, 234, 292.95,
526/318.2, 917, 235, 240, 287, 286, 307.6,
318.42, 318.5

[56] References Cited

U.S. PATENT DOCUMENTS

| | | | |
|---|---|---|---|
| 3,665,035 | 5/1972 | Rice et al. | 524/726 X |
| 3,767,629 | 10/1973 | Vallino, Jr. et al. | 526/84 X |
| 3,923,756 | 12/1975 | Svarz | 526/64 |
| 3,983,096 | 9/1976 | Segalini | 526/64 |
| 4,196,272 | 4/1980 | Goretta et al. | 526/64 |

*Primary Examiner*—Joseph L. Schofer
*Assistant Examiner*—F. M. Teskin
*Attorney, Agent, or Firm*—Birch, Stewart, Kolasch & Birch

[57] ABSTRACT

A less colored α, β-unsaturated carboxylic acid polymer having a relatively small molecular weight and a sharp molecular weight distribution is produced by supplying an α,β-unsaturated carboxylic acid monomer and a hydrogensulfite from one side of a reaction column and simultaneously supplying an oxygen-containing gas concurrently with the monomer to the reaction column. The polymer obtained is preferably used as a dispersant and an antiscaling agent.

10 Claims, 2 Drawing Sheets

F I G. 1
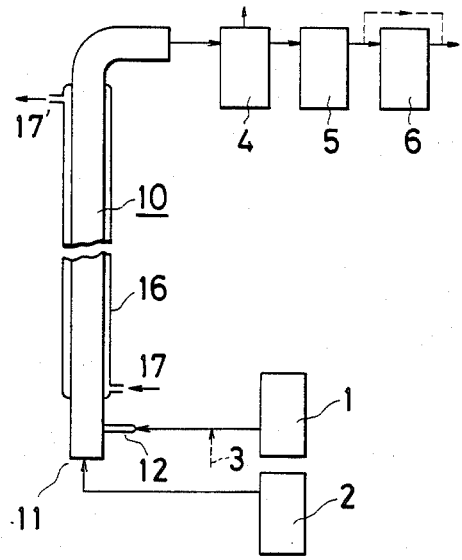
F I G. 2
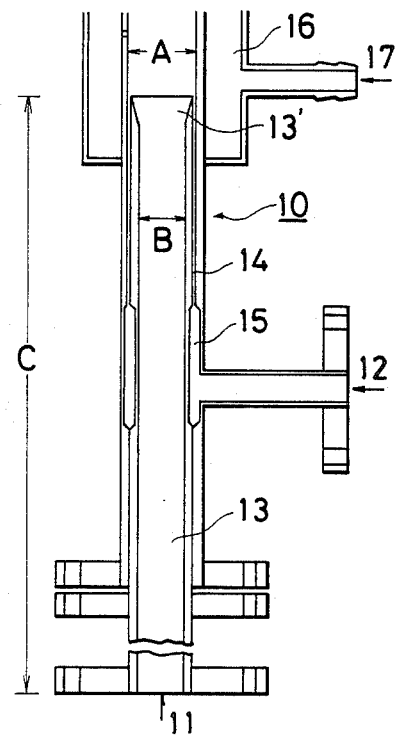

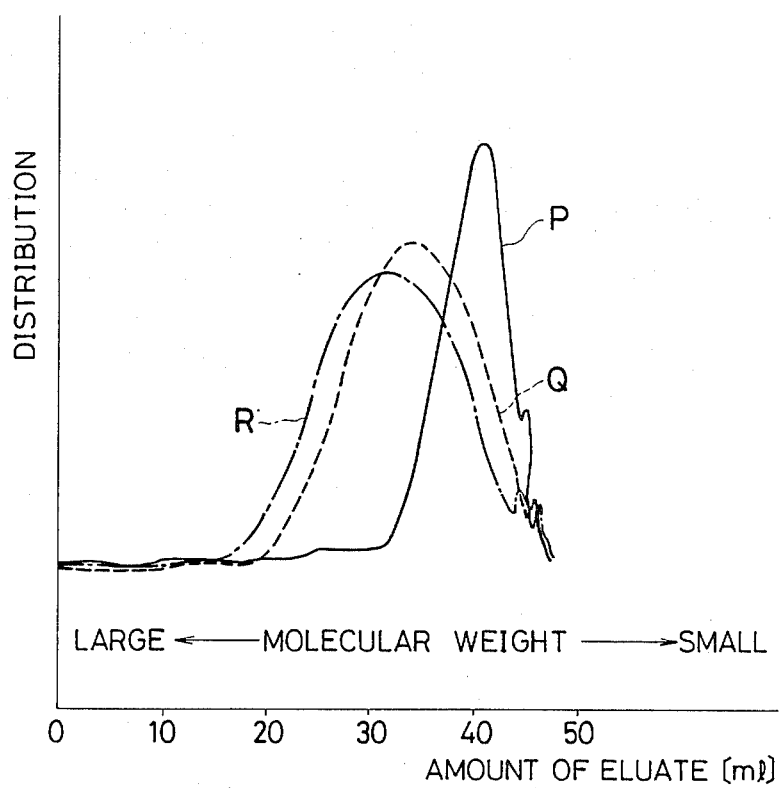

PROCESS FOR PRODUCING α,β-UNSATURATED CARBOXYLIC ACID POLYMER

BACKGROUND OF THE INVENTION

1. Field of the Invention

This invention relates to a process for producing an α,β-unsaturated carboxylic acid polymer, and more particularly it relates to a process for producing a polymer or a copolymer of α,β-unsaturated carboxylic acid(s) or salt(s) thereof. According to the present invention, polymers such as polyacrylic acid, polymethacrylic acid, polymaleic acid and alkali metal salts thereof and copolymers thereof, which are useful as dispersants or antiscaling agents, can be stably and continuously produced to give each a less-colored product showing a sharp, i.e., narrow molecular weight distribution.

2. Description of the Prior Art

As a process for continuously producing an α,β-unsaturated carboxylic acid polymer. Japanese Patent Publication No. 24806/1985 has disclosed a process for the production of acrylate polymer. Further Japanese Patent Laid-Open No. 28409/1985 has disclosed a process having similar objects as those of the former.

The process described in Japanese Patent Publication No. 24806/1985 is a polymerization process which comprises continuously adding an acrylate monomer and sodium hydrogensulfite dropwise to a stirred reaction vessel while introducing finely bubbled air thereto. It is disadvantageous since a decrease in the viscosity during the latter period of the polymerization makes it significantly troublesome to control the foaming, temperature, and bubbled air size.

On the other hand, when polyacrylic acid is produced according to the process of Japanese Patent Laid-Open No. 28409/1985 in a system where persulfate(s) and hydrogen peroxide are simultaneously employed, the circulating aqueous reaction mixture may be contaminated with a large amount of bubbles caused by the evolution of a gas, which seems to mainly comprise oxygen, accompanying the decomposition of the hydrogen peroxide and carbon dioxide gas, which is a side product. Thus, the recycle of the aqueous reaction mixture is made impossible shortly after the initiation of the operation. In addition, polyacrylic acid or the like to be used as a dispersant or an antiscaling agent preferably has a sharp molecular weight distribution and a relatively low molecular weight from the viewpoint of its adsorptivity, electric charge-imparting properties, etc. However the polyacrylic acid produced according to the process of Japanese Patent Laid-Open No. 28409/1985 has a wide molecular weight distribution and a large molecular weight.

Accordingly it is the major object of the present invention to provide a process for stably and continuously producing an α,β-unsaturated carboxylic acid polymer such as an acrylate polymer, which is useful as a dispersant or an antiscaling agent, to give a less colored product having a sharp, i.e., narrow molecular weight distribution.

SUMMARY OF THE INVENTION

According to the present invention, the above object is achieved by providing a process for producing an α,β-unsaturated carboxylic acid polymer characterized in that monomer(s) comprising one or more α,β-unsaturated carboxylic acids or salt(s) thereof as essential component(s) are polymerized or copolymerized with other hydrophilic monomer(s) copolymerizable with the above mentioned monomer(s) by supplying said monomer(s) and a hydrogensulfite from one side of a reaction column comprising a cylinder optionally having a double structure or a spiral reaction column and simultaneously supplying an oxygen-containing gas concurrently with said monomer(s) to said reaction column to thereby form a thin film stream of said monomer(s) on the inner wall of said reaction column by means of the gas stream of said gas to effect polymerization.

The apparatus used in the present process is characteristic of larger heat transfer area and larger gas-liquid interface area than the conventional stirred reaction vessel into which bubbles are introduced. The larger heat transfer area per unit liquid amount makes the temperature control easier, while the larger gas-liquid interface area enables more effective utilization of oxygen to the reaction, whereby the reaction is accelerated.

BRIEF DESCRIPTION OF THE DRAWINGS

FIG. 1 is a flow sheet roughly showing a preferable example of an apparatus for carrying out the present invention.

FIG. 2 is an enlarged vertical sectional view of the major parts of the apparatus as shown in FIG. 1.

FIG. 3 shows gel permeation chromatographs indicating the molecular weight distributions of a polyacrylic acid obtained by the process of the present invention and those obtained by conventional methods.

DETAILED DESCRIPTION OF THE INVENTION

Now the process for producing an α,β-unsaturated carboxylic acid polymer according to the present invention will be described in detail.

The monomers used in the present invention as the raw material may be selected from among α,β-unsaturated carboxylic acids, salts thereof and mixtures thereof. The process of the present invention is particularly suitable for polymerizing or copolymerizing monomer(s) comprising one or more materials selected from the group consisting of acrylic acid, methacrylic acid, itaconic acid, fumaric acid, maleic acid and salts thereof as essential component(s). The acrylic acid employed as the feed monomer includes anhydrous one, e.g., glacial acrylic acid or an aqueous solution thereof. Further aqueous solutions of alkali metal (e.g., sodium or potassium) acrylates partially or almost completely neutralized are also available. The maleic acid employed as the raw material includes anhydrous maleic acid and maleic acid itself. Further aqueous solutions of alkali metal (e.g., sodium or potassium) maleates partially or almost completely neutralized are also available.

These feed monomers may be copolymerized with a hydrophilic monomer capable of copolymerizing with an α,β-unsaturated carboxylic acid, such as acrylamide, methacrylamide, acrylonitrile, 2-hydroxyethyl acrylate, 2-hydroxyethyl methacrylate, vinyl sulfonic acid, sodium styrene sulfonate.

A particularly preferable hydrogensulfites used in the present invention are alkali metal salts, ammonium salt and triethanolamine salt.

A preferable embodiment of the production of an acrylate polymer comprises supplying acrylate monomer(s) (I) comprising (a) 20 to 100% by mole of an alkali metal acrylate; (b) 0 to 80% by mole of one or more monomers selected from the group consisting of acrylamide, 2-hydroxyethyl acrylate and 2-hydroxyethyl methacrylate; and (c) 0 to 30% by mole of a hydrophilic monomer capable of copolymerizing with the above components (a) and (b) (the total of the components (a), (b) and (c) being 100% by mole), and a hydrogensulfite (II) in an amount within the range of 0.008 to 0.4 mole per mole of said acrylate monomer(s) (I) each in the form of an aqueous solution to a reaction column separately or in the form of a combined mixture. In this embodiment, the concentrations of the aqueous solutions of the acrylate monomer(s) (I) and the hydrogensulfite (II) are preferably 10 to 60% by weight and 1 to 40% by weight, respectively.

The reaction column comprising a cylinder optionally having a double structure as used in the present invention has a structure wherein the above-mentioned feed monomer(s) and the hydrogensulfite can be supplied from one end thereof concurrently with an oxygen-containing gas to thereby form a thin film stream of said monomer(s) on the inner wall thereof to effect polymerization. For example, a cylinder provided with a jacket in which heat exchange can be effectively carried out with the use of a refrigerant can be employed. Alternately, a double-structured cylinder consisting of an outer cylinder provided with a jacket; an inner one containing a heat exchanging zone; and a circular space located between these cylinders which is used as a reaction zone may be employed. A reaction column having a height of 1 m or longer and comprising a cylinder having an inner diameter of 10 to 200 mm on which a thin film stream is formed may be preferably used. Alternately a spiral reaction column may be used.

In the embodiment of the present invention, the reaction column is usually held upright and the above mentioned feed monomer(s) and gas are concurrently supplied from the top or bottom of the same. It is particularly preferable that the feed monomer(s) and the gas are supplied from the bottom of the reaction column held upright to thereby form a rising thin film stream of the feed monomer(s) by the gas stream. Instead of being held upright, the reaction column may optionally be held inclined at an angle of 60° or lower from a perpendicular line.

In the particularly preferable process as mentioned above, the rising thin film stream does not simply rise along the inner wall of the reaction column but rises while revolving upward against gravity in such a manner as to be stripped off from the wall, so that a mixing phenomenon accompanying the rising allows the reaction mixture which forms the thin film stream to react efficiently.

The amounts of the feed monomer(s) and the oxygen-containing gas to be supplied to the reaction column may vary depending on the method of supplying the components and the structure of the reaction column. These components may be supplied in such a manner as to form a thin film stream of thickness of 0.2 to 5 mm on the inner wall of the reaction column and to transport said thin film stream at a rate of 0.2 to 20 m/min. More particularly, when a reaction column having the preferable height and inner diameter as determined above is held upright and the reaction mixture comprising the feed monomer(s) and the hydrogensulfite as well as the gas are supplied from the bottom of the column, the reaction mixture, which preferably corresponds to 10 to 60% by weight of the total supply, may be supplied at a rate of 0.001 to 2 m$^3$/hr, the gas may be supplied at a rate of 0.01 to 30 m$^3$/min and the gas and the thin film stream in the reaction column may be transported at rates of 2 to 100 m/sec and 0.2 to 20 m/min, respectively. It is further preferable that the inside of the reaction column is maintained at a temperature of 5° to 80° C. by heat-exchanging with the use of a refrigerant.

Now a preferable example of an apparatus as shown in FIGS. 1 and 2 which is used in the embodiment of the present invention will be described.

FIG. 1 is a flow sheet roughly showing the total system of the apparatus while FIG. 2 is an enlarged vertical section of its major parts. In this apparatus, the reaction column is held upright and feed monomer(s) and gas are supplied from the bottom of the column.

In these figures, 1 is a feed monomer preparation section; 2 is an oxygen-containing gas supply source; 3 is a supply section for the hydrogensulfite to be mixed with the monomer(s); 10 is a reaction column; 4 is a cooling section for gas-liquid separation of the reaction product overflowing from the top of the reaction column 10; 5 is a reaction product aging section; 6 is a section for adjusting the pH value of the reaction product; 11 is a gas inlet; and 12 is a reaction mixture inlet. The reaction column 10 is provided with a gas supply pipe 13 in the lower part thereof and the top 13' of the pipe 13 is broadened at an angle of approximately 10°. 14 is a supply passageway for the reaction mixture located between the inner wall of the reaction column 10 and the gas supply pipe 13. The reaction mixture is supplied from the reaction mixture inlet 12 to the reaction column 10 via a liquid chamber 15 and the reaction mixture supply passageway 14. Thus, a rising thin film stream is formed on the inner wall of the reaction column 10 by the gas stream supplied from the gas supply pipe 13. 16 is a jacket provided around the reaction column 10; 17 is a refrigerant inlet; and 17' is a refrigerant outlet. A refrigerant is passed through said jacket 16 to thereby perform the reaction at a predetermined temperature. In addition, A is the inner diameter of the reaction column 10; B is the inner diameter of the gas supply pipe 13; and C is the height of a gas blow adjusting section. It is preferable that C is not less than 10×B (C≧10×B).

Thus, the process of the present invention can be performed with the use of the above-mentioned apparatus in the following manner.

Namely, a predetermined amount of feed monomer(s) which are previously prepared in the feed monomer preparation section 1, and a predetermined amount of a hydrogensulfite supplied from the supply section 3 are supplied each with a constant delivery pump, which is not shown in the figure, and mixed together to give a reaction mixture. The obtained reaction mixture is supplied from the inlet 12 to the reaction column 10 via the liquid chamber 15 and the reaction mixture supply passageway 14. At the same time, an oxygen-containing gas in the gas source 2 is supplied from the inlet 11 to the reaction column 10 via the gas supply pipe 13. Thus, the reaction mixture is vigorously stirred by the gas stream and formulated into a thin film stream rising along the inner wall of the reaction column 10 by the driving force of the gas stream. The reaction product thus formed overflows from the top of the reaction column 10 into the gas-liquid separation and cooling section 4 where it is separated into a gas and a liquid and cooled. The stream may be introduced into the aging section 5 and the pH value adjusting section 6, if required, to give the aimed product.

FIG. 3 shows gel permeation chromatographs (GPC) each indicating the molecular weight distributions of a carboxylic acid polymer obtained by the process of the present invention and those obtained by conventional methods, wherein P shows a chromatograph of a polymer obtained by the process of the present invention, Q is that of one obtained by a conventional batchwise method as will be shown in comparative examples hereinafter and R is that of one obtained by another conventional one-step circulation method as described in Japanese Patent Laid-Open No. 28409/1985. In FIG. 3, the abscissa refers an amount of eluate corresponding to the molecular weight while the ordinate refers to the distribution of molecules differing in the molecular weight from each other. Although each chromatograph would somewhat vary depending on the operation conditions, the chromatograph obtained through the process of the present invention generally differs from those obtained through conventional methods as shown in FIG. 3.

To further illustrate the process of the present invention, and not by way of limitation, the following example and comparative examples will be given, wherein all percentages are by weight.

EXAMPLE

A reaction column having a structure shown in FIG. 1 was used. The reaction column of 12 mm in inner diameter and 8 m in height provided with a jacket was fixedly held upright and the bottom of the column was covered with a lid equipped with a nozzle while the top of the column was connected to a gas-liquid separator through a pipe for recovering the overflowing reaction product. A reaction mixture and a gas were supplied from said bottom nozzle in such a manner as to form a rising thin film stream of the reaction mixture by means of the gas stream. The reaction was carried out under each condition as shown in the following Tables 1 and 2. These tables also show the results. An aqueous solution of a feed monomer and an aqueous solution of a hydrogensulfite were supplied each through a constant delivery pump and mixed together prior to the introduction into the reaction column to give a reaction mixture. Air was employed as the oxygen-containing gas. The measurement of the molecular weight was conducted with gel permeation chromatography (GPC) wherein dextrin is used as a standard.

TABLE 1

(Polymerization)

| No. | Aqueous solution of sodium acrylate Degree of neutralization (%) | Concentration (Wt %) | Supply (Kg/Hr) | Aqueous solution of sodium hydrogensulfite Concentration (Wt %) | Supply (Kg/Hr) | Air supply ($m^3$/Hr) | Average temperature in jacket (°C.) | Average temperature in reaction (°C.) | Ratio of reacted monomer[*1] (%) | Number-average molecular weight |
|---|---|---|---|---|---|---|---|---|---|---|
| 1 | 90 | 33.3 | 3.89 | 30 | 0.63 | 8.1 | 20 | 27 | 91.0 | 5400 |
| 2 | 90 | 36.4 | 4.56 | 30 | 0.60 | 8.1 | 19 | 27 | 90.3 | 6490 |
| 3 | 90 | 36.4 | 4.66 | 30 | 0.52 | 8.1 | 19 | 29 | 92.7 | 7200 |
| 4 | 90 | 41.6 | 3.97 | 30 | 0.88 | 7.8 | 20 | 31 | 92.5 | 6020 |
| 5 | 90 | 40.0 | 4.45 | 32.8 | 1.01 | 8.5 | 18 | 22 | 93.5 | 6030 |
| 6 | 70 | 48.1 | 2.78 | 35 | 1.08 | 7.8 | 20 | 30 | 93.8 | 4630 |
| 7 | 70 | 48.1 | 3.72 | 35 | 1.06 | 7.8 | 20 | 30 | 94.6 | 5290 |
|   | Aqueous solution of potassium acrylate | | | Aqueous solution of sodium hydrogensulfite | | | | | | |
| 8 | 98 | 41.0 | 6.20 | 32.8 | 1.02 | 7.4 | 16 | 21 | 97.3 | 2790 |
| 9 | 98 | 41.0 | 6.20 | 32.8 | 0.58 | 7.0 | 17 | 22 | 97.7 | 4020 |
| 10 | 98 | 41.0 | 5.87 | 32.8 | 0.28 | 10.0 | 18 | 25 | 97.2 | 7360 |
|   | Aqueous solution of potassium acrylate | | | Aqueous solution of sodium hydrogensulfite | | | | | | |
| 11 | 98 | 41.0 | 5.92 | 32.4 | 0.48 | 6.7 | 18 | 25 | 96.5 | 5280 |

[*1]The rate of reacted monomer is determined by measurig the residual monomer by bromine addition.

TABLE 2

(Copolymerization)

| No. | Monomer Sodium acrylate (90% neutralized) concentration[*2] (Mol/Kg) | Monomer - II Chemical name | Concentration[*2] (Mol/Kg) | Supply (Kg/Hr) | Sodium hydrogensulfite Concentration (Wt %) | Supply (Kg/Hr) | Air supply ($Nm^3$/Hr) | Average temperature in jacket (°C.) | Average temperature in reaction column (°C.) | Ratio of reacted monomer (%) | Number-average molecular weight |
|---|---|---|---|---|---|---|---|---|---|---|---|
| 12 | 3.65 | Acrylamide | 0.91 | 5.26 | 32.8 | 0.63 | 151 | 16 | 19 | 90.0 | 6230 |
| 13 | 3.02 | Acrylonitrile | 0.33 | 5.14 | 32.8 | 0.72 | 148 | 17 | 20 | 82.0 | 6530 |
| 14 | 3.21 | Sodium methacrylate (90% neutralized) | 0.80 | 5.31 | 32.8 | 0.64 | 155 | 16 | 20 | 88.0 | 6130 |
| 15 | 2.11 | 2-hydroxyethyl- | 0.43 | 5.11 | 32.8 | 0.64 | 160 | 16 | 19 | 91.0 | 5540 |

TABLE 2-continued

| (Copolymerization) | | | | | | | | | | |
|---|---|---|---|---|---|---|---|---|---|---|
| | Monomer | | | | | | | | | |
| | Sodium acrylate (90% neutralized) concentration*2 | Monomer - II | | | Sodium hydrogensulfite | | Air supply (Nm³/Hr) | Average temperature in jacket (°C.) | Average temperature in reaction column (°C.) | Ratio of reacted monomer (%) | Number-average molecular weight |
| No. | (Mol/Kg) | Chemical name | Concentration*2 (Mol/Kg) | Supply (Kg/Hr) | Concentration (Wt %) | Supply (Kg/Hr) | | | | | |
| | | acrylate | | | | | | | | | |

*2 The concentration of the monomer is a concentration at a state when the two kinds of monomers are mixed.

Comparative Example 1

1400 kg of water was introduced into a reaction tank of 10 m³ in volume and heated to 100° C. Then 370 kg of 30% sodium persulfate, 3800 kg of 80% acrylic acid, 2500 g of 49% caustic soda and 1230 kg of 35% hydrogen peroxide were added dropwise thereto over eight hours while controlling the temperature of the reaction tank to 97° C. Then small amounts of water and sodium persulfate were further added thereto and the reaction was allowed to proceed. After cooling and neutralizing, polysodium acrylate was obtained. The aqueous solution of this polymer was in the form of a pale yellow liquid. The number-average molecular weight of this polymer was 8,500.

Comparative Example 2

262 g of water was introduced into a reaction tank of 3 l in volume. Then 1749 g of a 42% aqueous solution of sodium acrylate of a degree of neutralization of 90% and 312 g of a 40% aqueous solution of sodium hydrogensulfite were successively added dropwise thereto within four hours while controlling the temperature of the reaction tank to 25° to 30° C. During the addition, air was bubbled thereinto at a rate of 700 cc/min. After the completion of the successive addition, air was bubbled for additional 30 minutes for aging. In the latter stage of this reaction, the viscosity of the reaction system increased, which made the mixing of the whole system troublesome. Thus, the obtained polymer showed a broad molecular weight distribution and the number-average molecular weight of the same was 10,000.

According to the process of the present invention for producing an $\alpha,\beta$-unsaturated carboxylic acid polymer, a hardly colored $\alpha,\beta$-unsaturated carboxylic acid polymer having a relatively small molecular weight and a sharp molecular weight distribution (cf. FIG. 3) and containing no contaminant such as decomposition products of persulfates can be obtained. Therefore the $\alpha,\beta$-unsaturated carboxylic acid polymer obtained by the present invention exhibits a high dispersibility as well as high chelating properties and available as, for example, a dispersant for inorganic pigments, a builder for detergents and an antiscaling agent.

What is claimed is:

1. A process for producing a polymer of at least one $\alpha,\beta$-unsaturated carboxylic acid or salt thereof wherein (a) at least one monomer comprising one or more $\alpha,\beta$-unsaturated carboxylic acids or salts thereof as essential components are polymerized or copolymerized with (b) at least one other hydrophilic monomer copolymerizable with (a), by supplying (a), (b) and a hydrogensulfite from one side of a reaction column and simultaneously supplying an oxygen-containing gas concurrently with (a) and (b) to said reaction column to form a film stream of (a) and (b) on the inner wall of said reaction column by means of the gas stream of said oxygen-containing gas to effect polymerization.

2. The process as set forth in claim 1, wherein a rising film stream is made of (a) and (b) by holding said reaction column upright and supplying (a) and (b) and said gas from the bottom of said reaction column.

3. The process as set forth in claim 1, wherein a descending film stream is made of said film stream of (a) and (b) by holding said reaction column upright and supplying (a) and (b) and said gas from the top thereof.

4. The process as set forth in claim 1, wherein said polymer of at least one $\alpha,\beta$-unsaturated carboxylic acid or salt thereof is selected from the group consisting of acrylic acid, methacrylic acid, $\alpha$-halogen-substituted acrylic acid, itaconic acid, fumaric acid and maleic acid.

5. The process as set forth in claim 1, wherein (b) is selected from the group consisting of, acrylamide, methacrylamide, acrylonitrile, 2-hydroxyethyl acrylate, 2-hydroxyethyl methacrylate, vinyl sulfonic acid, and sodium styrene sulfonate.

6. The process as set forth in claim 1, wherein the hydrogensulfite is selected from the group consisting of alkali metal salts, ammonium salt and triethanolamine salt.

7. The process as set forth in claim 1, which comprises supplying acrylate monomer(s) (I) containing (i) 20 to 100% by mole of an alkali metal acrylate; (ii) at most 80% by mole of one or more monomers selected from the group consisting of acrylamide, 2-hydroxyethyl acrylate and 2-hydroxyethyl methacrylate; and (iii) at most 30% by mole of a hydrophilic monomer capable of copolymerizing with the above components (i) and (ii), the total of the components (i), (ii) and (iii) being 100% by mole, and a hydrogensulfite (II) in an amount within the range of 0.008 to 0.4 mole per mole of said acrylate monomer(s) (I) each in the form of an aqueous solution to a reaction column separately or in the form of a combined mixture, wherein the concentrations of the aqueous solutions of the acrylate monomer(s) (I) and the hydrogensulfite (II) are 10 to 60% by weight and 1 to 40% by weight, respectively.

8. The process as set forth in claim 1, wherein the thickness of the film stream on the inner wall of the reaction columns is 0.2 to 5 mm.

9. The process as set forth in claim 1, wherein (a) and (b) are supplied at a rate of 0.001 to 2 m³/hr, the gas stream is supplied at a rate of 0.01 to 30 m³/min and the gas and the thin film stream in the reaction column are transported at rates of 2 to 100 m/sec and 0.2 to 20 m/min, respectively.

10. The process as set forth in claim 1, wherein the inside of the reaction column is maintained at a temperature of 5° to 80° C.

* * * * *